United States Patent
Niitsuma

(10) Patent No.: US 9,658,679 B2
(45) Date of Patent: May 23, 2017

(54) INFORMATION PROCESSING APPARATUS THAT PERFORMS USER AUTHENTICATION, METHOD OF CONTROLLING THE SAME, AND STORAGE MEDIUM

(71) Applicant: CANON KABUSHIKI KAISHA, Tokyo (JP)

(72) Inventor: Hiroaki Niitsuma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 724 days.

(21) Appl. No.: 13/761,270

(22) Filed: Feb. 7, 2013

(65) Prior Publication Data
US 2013/0205156 A1 Aug. 8, 2013

(30) Foreign Application Priority Data
Feb. 8, 2012 (JP) .................................. 2012-025021

(51) Int. Cl.
*G06F 1/32* (2006.01)

(52) U.S. Cl.
CPC .......... *G06F 1/3287* (2013.01); *G06F 1/3231* (2013.01); *Y02B 60/1282* (2013.01); *Y02B 60/1289* (2013.01); *Y02B 60/32* (2013.01)

(58) Field of Classification Search
CPC ..... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS 5,996,080 A * 11/1999 Silva .................... G06F 1/1626
345/169
6,658,576 B1 * 12/2003 Lee .............................. 713/320
(Continued)

FOREIGN PATENT DOCUMENTS

JP 2001101351 A 4/2001
JP 2004199445 A 7/2004
(Continued)

OTHER PUBLICATIONS

Japanese Office Action issued in Japanese counterpart application No. JP2012-025021, dated Nov. 17, 2015.
(Continued)

*Primary Examiner* — Thomas Lee
*Assistant Examiner* — Mohammad A Rahman
(74) *Attorney, Agent, or Firm* — Rossi, Kimms & McDowell LLP

(57) ABSTRACT

An information processing apparatus that improves the convenience of a user who performs authentication using an authentication medium. A communication system module acquires authentication information from an IC card. A sensor system module detects proximity of the IC card. A main circuit element group authenticates a user using the acquired authentication information. A power supply controller supplies power to those modules and the group. A power supply destination is controlled such that the apparatus is shifted to a power saving state in which power is supplied only to the sensor system module. In the power saving state, when the sensor system module detects proximity of the IC card, the power supply destination is controlled to cause the apparatus to shift to a normal power state in which power is supplied to the communication system module and the main circuit element group.

10 Claims, 9 Drawing Sheets

(56) References Cited

U.S. PATENT DOCUMENTS

| | | | | |
|---|---|---|---|---|
| 6,691,233 | B1* | 2/2004 | Gannage | G06F 1/1632 713/300 |
| 7,424,627 | B2* | 9/2008 | Kobayashi | G11B 19/04 711/111 |
| 7,437,577 | B2* | 10/2008 | Obara | G06F 1/3215 348/E5.096 |
| 7,481,360 | B1* | 1/2009 | Ramachandran | G06Q 20/18 235/379 |
| 8,176,537 | B2* | 5/2012 | Ban | G06F 21/608 713/168 |
| 8,230,243 | B2* | 7/2012 | Fujiwara | G06F 1/266 713/310 |
| 8,281,992 | B2 | 10/2012 | Bando et al. | |
| 8,630,007 | B2* | 1/2014 | Doui | G06F 21/608 358/1.13 |
| 2003/0158763 | A1* | 8/2003 | McKee | G06Q 30/02 702/81 |
| 2003/0210737 | A1* | 11/2003 | Linder | H04B 1/69 375/219 |
| 2005/0289363 | A1* | 12/2005 | Tsirkel et al. | 713/300 |
| 2006/0203278 | A1* | 9/2006 | Makishima | H04N 1/00209 358/1.14 |
| 2007/0165262 | A1* | 7/2007 | Watanabe | G03G 15/5016 358/1.14 |
| 2009/0006857 | A1* | 1/2009 | Cheng | G06F 21/575 713/183 |
| 2009/0251291 | A1* | 10/2009 | Borcherding | G06K 7/10128 340/10.1 |
| 2010/0023788 | A1* | 1/2010 | Scott et al. | 713/320 |
| 2010/0093273 | A1* | 4/2010 | Hohl | 455/7 |
| 2010/0306563 | A1* | 12/2010 | Chen et al. | 713/323 |
| 2011/0221483 | A1* | 9/2011 | Liu et al. | 327/142 |
| 2012/0014569 | A1* | 1/2012 | Frye | G06K 9/0004 382/124 |
| 2012/0025948 | A1* | 2/2012 | Lakamraju | E05B 47/00 340/5.6 |
| 2012/0275812 | A1* | 11/2012 | Takiguchi | G03G 15/5004 399/88 |

FOREIGN PATENT DOCUMENTS

| | | |
|---|---|---|
| JP | 2005157572 A | 6/2005 |
| JP | 2009-288971 A | 12/2009 |
| JP | 2010140367 A | 6/2010 |
| JP | 2010211577 A | 9/2010 |
| JP | 2012016853 A | 1/2012 |

OTHER PUBLICATIONS

Office Action issued in Japanese Appln. No. 2012-025021 mailed Jul. 5, 2016.

Japanese Office Action issued in counterpart application No. JP2012025021, dated Feb. 16, 2016.

* cited by examiner

INFORMATION PROCESSING APPARATUS THAT PERFORMS USER AUTHENTICATION, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

In recent years, due to increasing concerns about security, in the use of an image processing apparatus, such as a printer or a multifunction peripheral, installed in an office, there is a demand for providing functions of the image processing apparatus only to persons who are permitted to use the image processing apparatus, by user authentication.

Further, due to growing environmental consciousness, there is an increasing demand for reduction of the amount of power consumed by the image processing apparatus when it is in a non-operating state.

To meet such the demand, there has been proposed a technique for supplying power less than usual to a main controller which controls the image processing apparatus or shutting off the power supply to the main controller, when the image processing apparatus is in the non-operating state, to thereby realize a power saving mode in which power consumption of the image processing apparatus is reduced.

While reduction of power consumption is demanded as above, to perform the above-mentioned user authentication, it is necessary to continue to supply power to components that operate for authentication processing. That is, it is envisaged to continue power supply to the components required to operate for user authentication but shut off power supply to the other components which are not related to the authentication processing to thereby reduce power consumption of the image processing apparatus while making it possible to perform user authentication.

In relation to such techniques, there has been disclosed a technique which enables, when requested to perform user authentication by the user e.g. with an IC card, an image processing apparatus operating in the power saving mode to perform user authentication and further return to a normal power mode when the user has been authenticated (see Japanese Patent Laid-Open Publication No. 2009-288971).

However, in the technique disclosed in Japanese Patent Laid-Open Publication No. 2009-288971, the authentication processing is carried out in the power saving mode in which the image processing apparatus continues power supply to the components operating for authentication processing, and hence the reduction of power consumption is not necessarily achieved with high efficiency.

This is because it is necessary to enable a storage area that stores account information of users also in the power saving mode, and further perform processing for verifying the user against the account information, and hence an amount of power consumed by the components for authentication processing is not small.

Further, there is generally a system that performs authentication processing using an external server connected to the image processing apparatus via a network. However, to perform authentication using the server, the image processing apparatus is required to perform communication with the server while remaining in the power saving mode, which naturally increases power consumption.

To cope with this, it is desirable to start supplying power to the components operating for authentication processing, after the image processing apparatus has returned from the power saving mode to the normal power mode according to the user's instruction, to thereby immediately enable the image processing apparatus to perform user authentication.

In general, the image processing apparatus is autonomously shifted to the power saving mode without making the user conscious of the shift, and hence it is difficult for the user to determine whether the image processing apparatus is waiting in the power saving mode or in the normal power mode.

When the user performs user authentication using e.g. an IC card as an authentication medium, in a state where the user is unaware that the image processing apparatus is in the power saving mode, the image processing apparatus neither returns from the power saving mode to the normal power mode nor performs user authentication processing.

Therefore, the user is required to perform an operation for returning the image processing apparatus from the power saving mode, and then perform user authentication using e.g. an IC card again, which is inconvenient for the user.

SUMMARY OF THE INVENTION

The present invention provides an information processing apparatus that improves the convenience of a user who performs authentication using an authentication medium, a method of controlling the information processing apparatus, and a storage medium.

In a first aspect of the present invention, there is provided a information processing apparatus comprising an acquisition unit configured to acquire authentication information from an authentication medium for use in authentication of a user, a detection unit configured to detect the authentication medium, a power supply unit configured to supply power to the acquisition unit and the detection unit, and a power control unit configured to control a power supply destination to which power is supplied from the power supply unit such that the information processing apparatus is shifted to a power saving state in which power is supplied to the detection unit, and the power supply to the acquisition unit is shut off, wherein in the power saving state of the information processing apparatus, when the authentication medium is detected by the detection unit, the power control unit controls the power supply destination to which power is supplied from the power supply unit such that the information processing apparatus is shifted to a normal power state in which power is supplied to the acquisition unit.

In a second aspect of the present invention, there is provided a method of controlling an information processing apparatus including an acquisition unit configured to acquire authentication information from an authentication medium for use in authentication of a user, a detection unit configured to detect the authentication medium, and a power supply unit configured to supply power to the acquisition unit and the detection unit, the method comprising executing power control for controlling a power supply destination to which power is supplied from the power supply unit such that the information processing apparatus is shifted to a power saving state in which power is supplied to the detection unit, and the power supply to the acquisition unit is shut off, and executing power control for controlling, in the power saving state of the information processing apparatus, when the authentication medium is detected by the detection unit, the power supply destination to which power is supplied from the power supply unit such that the information processing apparatus is shifted to a normal power state in which power is supplied to the acquisition unit.

In a third aspect of the present invention, there is provided a non-transitory computer-readable storage medium storing a computer-executable program for executing a method of controlling an information processing apparatus including an acquisition unit configured to acquire authentication information from an authentication medium for use in authentication of a user, a detection unit configured to detect the authentication medium, and a power supply unit configured to supply power to the acquisition unit and the detection unit, wherein the method comprises executing power control for controlling a power supply destination to which power is supplied from the power supply unit such that the information processing apparatus is shifted to a power saving state in which power is supplied to the detection unit, and the power supply to the acquisition unit is shut off, and executing power control for controlling, in the power saving state of the information processing apparatus, when the authentication medium is detected by the detection unit, the power supply destination to which power is supplied from the power supply unit such that the information processing apparatus is shifted to a normal power state in which power is supplied to the acquisition unit.

According to the present invention, it is possible to provide an information processing apparatus that improves the convenience of the user who performs authentication using an authentication medium, a method of controlling the information processing apparatus, and a storage medium.

Further features of the present invention will become apparent from the following description of exemplary embodiments with reference to the attached drawings.

BRIEF DESCRIPTION OF THE DRAWINGS

FIGS. 5A and 5B are views each showing the internal configuration of the card reader shown in FIG. 4, in which FIG. 5A is a transparent view of the card reader, and FIG. 5B is a vertical cross-sectional view of the card reader.

DESCRIPTION OF THE EMBODIMENTS

The present invention will now be described in detail below with reference to the accompanying drawings showing embodiments thereof.

Figure 1:
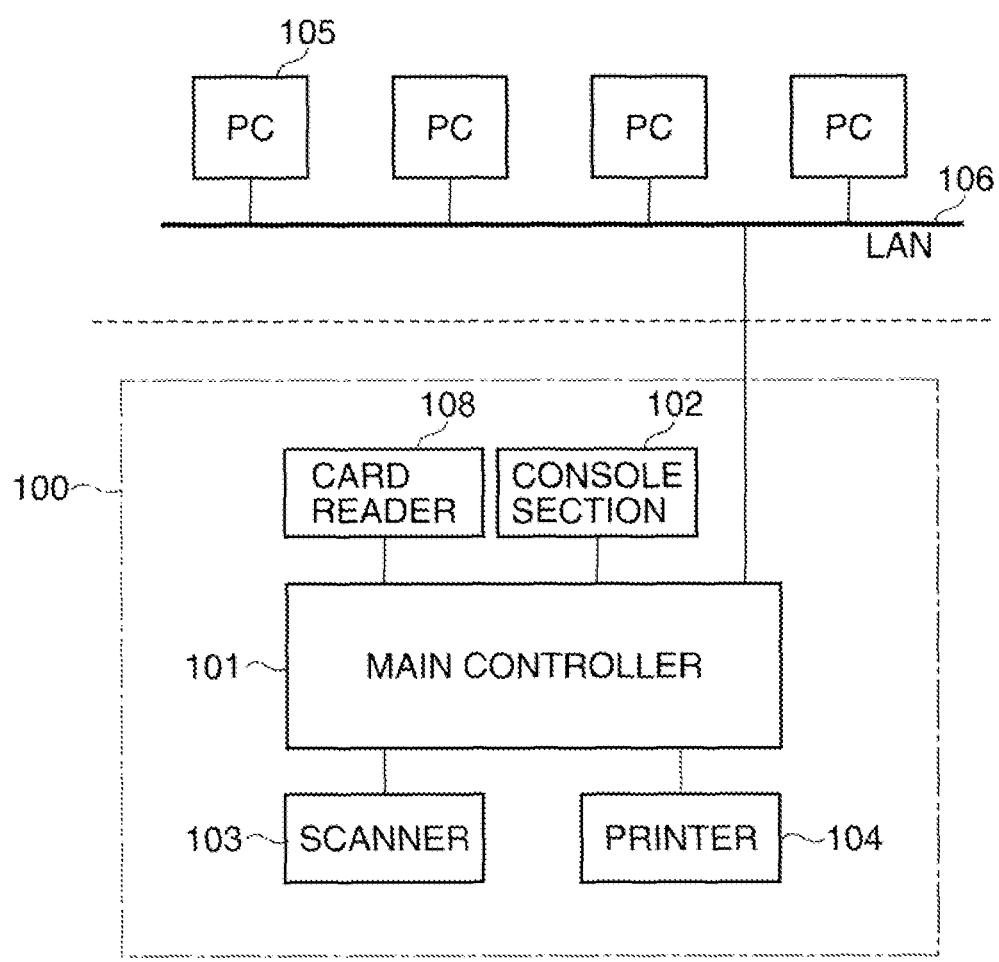
FIG. 1 is a block diagram of a system including an image processing apparatus according to an embodiment of the present invention.

FIG. 1 is a block diagram of a system including an image processing apparatus 100 as an information processing apparatus according to an embodiment of the present invention.

In FIG. 1, the image processing apparatus 100 includes a main controller 101, a console section 102, a card reader 108, a scanner 103, and a printer 104.

The main controller 101 controls the overall operation of the image processing apparatus 100, and the configuration thereof will be described hereinafter. The console section 102 is the user interface. The card reader 108 is the user authentication device. The scanner 103 is an image input device. The printer 104 is an image output device.

The console section 102, the scanner 103, and the printer 104 are connected to the main controller 101, respectively, and are controlled according to instructions from the main controller 101. The main controller 101 is further connected to a LAN (local area network) 106, and is connected to a PC 105, etc. on the LAN 106.

With the above-described arrangement, the image processing apparatus 100 performs inputting and outputting of images, transmission and reception of images, and various image processing.

Figure 2:
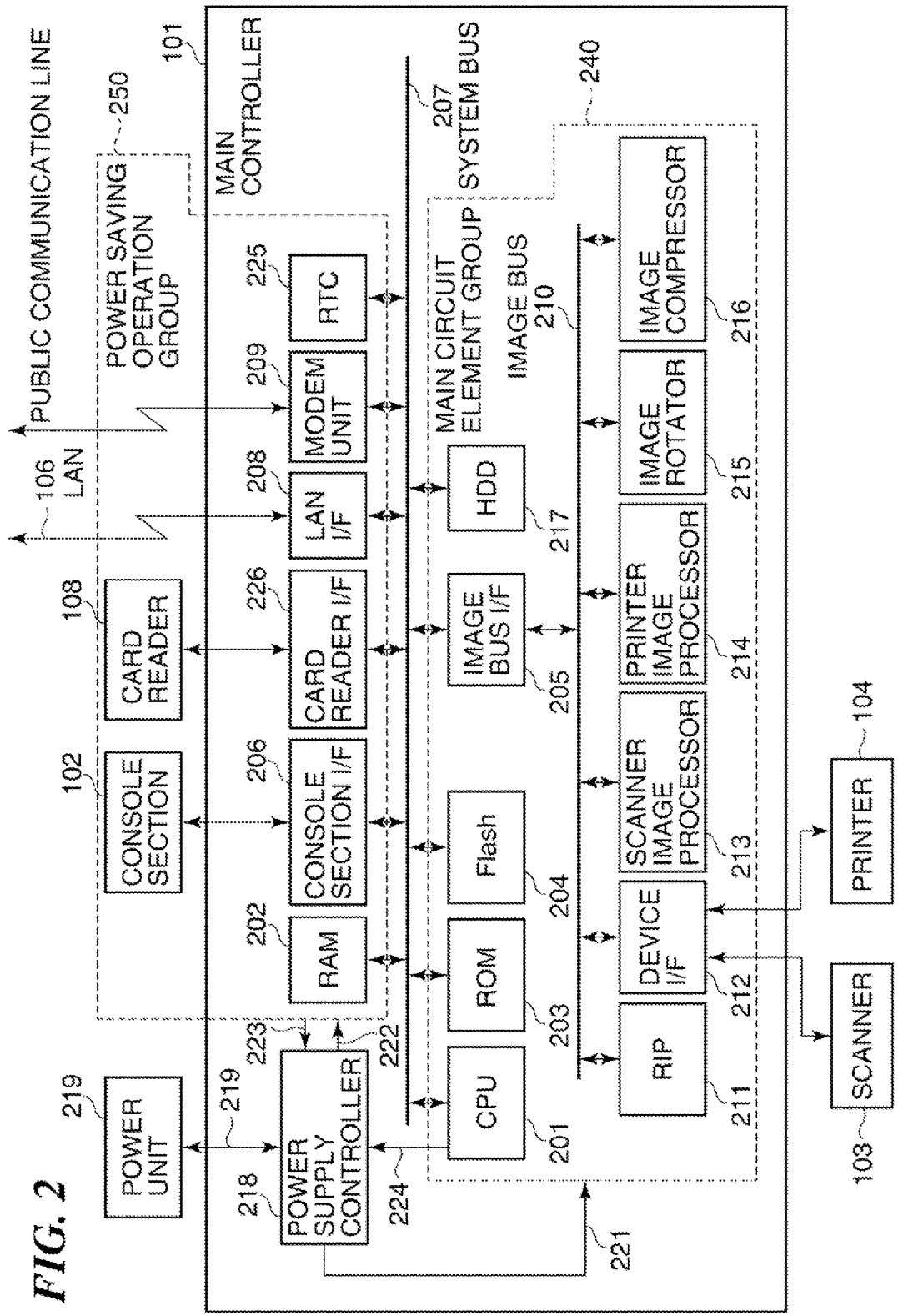
FIG. 2 is a schematic block diagram of a main controller appearing in FIG. 1.

FIG. 2 is a schematic block diagram of the main controller 101 appearing in FIG. 1.

The main controller 101 shown in FIG. 2 controls the scanner 103 and the printer 104 connected thereto, and is further connected to the LAN 106 and a public communication line. The main controller 101 performs outputting and inputting of image information, device information, files, and so on, to and from external devices.

The main controller 101 includes a CPU (central processing unit) 201. The CPU 201 is connected to a RAM (random access memory) 202, a ROM (read only memory) 203, a flash memory 204, and an image bus interface 205, via a system bus 207.

The CPU 201 is further connected to a console section interface 206, a LAN interface 208, a modem unit 209, a RTC (real time clock) 225, a HDD 217, and a card reader interface 226.

The RAM 202 is a memory writable and readable at any time which provides a work area for the CPU 201. The RAM 202 is also used as an image memory for temporarily storing image data.

The ROM 203 is a boot ROM storing a boot program for the system. The flash memory 204 is a nonvolatile memory that stores system software and settings data required to be held even after the image processing apparatus 100 is shut down.

The HDD (hard disk drive) 217 is a nonvolatile data storage device for storing image data, address book data, job logs, and various data, such as user account information and individual data. Note that in a case where the image processing apparatus 100 is configured such that the HDD 217 is not connected to the main controller 101, the above-mentioned various data is stored in the flash memory 204.

The console section interface 206 is an interface for outputting and inputting data to and from the console section 102. The console section interface 206 outputs image data to be displayed to the console section 102, and is further used for transferring information input by the user via the console section 102 to the CPU 201.

The card reader interface 226 is used for transferring authentication data (authentication information) input from the card reader 108 for user authentication to the CPU 201.

The LAN interface 208 is an interface for connecting to the LAN 106, and performs outputting and inputting of information to and from the LAN 106. The modem unit 209 is an interface for connecting to the public communication line, and performs outputting and inputting of information to and from the public communication line. The RTC 225 manages the current time.

The image bus interface 205 is an interface for connecting between the system bus 207 and an image bus 210 that transfers image data at high speed, and operates as a bus bridge that converts the data structure.

A RIP (raster image processor) 211, a device interface 212, a scanner image processor 213, a printer image processor 214, an image rotator 215, and an image compressor 216 are connected to the image bus 210.

The RIP 211 converts PDL (page description language) data received via the LAN 106 to a bitmap image. The device interface 212 is an interface for connecting between the scanner 103 and the printer 104, and the main controller 101, and performs synchronous-asynchronous conversion of image data.

The scanner image processor 213 performs image processing, such as correction, processing, and editing, on input image data received from the scanner 103. The printer image processor 214 performs processing, such as color conversion, filtering, resolution conversion, on print output image data to be output to the printer 104. The image rotator 215 rotates image data.

The image compressor 216 compresses or expands multivalued image data by JPEG, and compresses or expands binary image data e.g. by JBIG, MMR or MH.

A power supply controller 218 supplies DC power received from a power unit 219 via a power supply line 220 to predetermined circuit elements of the main controller 101 via power supply lines 221 and 222.

The power supply controller 218 performs power supply control of the power supply lines 221 and 222 based on a control signal received via a control signal line 223 from a power saving operation group, described hereinafter, to which the power supply line 222 is connected, and a control signal received via a control signal line 224 from the CPU 201.

The power supply line 221 is connected to the CPU 201, the ROM 203, the flash memory 204, the image bus interface 205, and the HDD 217. The power supply line 221 is further connected to the RIP 211, the device interface 212, the scanner image processor 213, the printer image processor 214, the image rotator 215, and the image compressor 216. These devices to which power is supplied via the power supply line 221 are collectively referred to as a main circuit element group 240. The power supply controller 218 corresponds to a power supply unit that supplies power to a sensor system module 21, a communication system module 17 (see FIG. 4), and the main circuit element group 240.

The power supply line 222 is connected to the RAM 202, the console section interface 206, the card reader interface 226, the LAN interface 208, the modem unit 209, and the RTC 225.

Further, the console section interface 206 supplies power to the console section 102, and the card reader interface 226 supplies power to the card reader 108.

These devices to which power is supplied via the power supply line 222 are collectively referred to as a power saving operation group 250.

In the above-described configuration of the main controller 101, the image processing apparatus 100 has two electric power modes of a normal power mode (normal power state) and a power saving mode (power saving state) which are different in power state and set according to an operating condition of the image processing apparatus 100.

In both of the normal power mode and the power saving mode, the power unit 219 supplies power to the power supply controller 218 via the power supply line 220.

In the normal power mode, the CPU 201 controls power supply destination to which power is supplied from the power supply controller 218, such that the power supply via the power supply line 221 and the power supply line 222 is enabled.

On the other hand, in the power saving mode, the CPU 201 controls the power supply destination to which power is supplied from the power supply controller 218, such that the power supply via the power supply line 221 is disabled. In the power saving mode, the CPU 201 further controls the power supply destination to which power is supplied from the power supply controller 218, such that the power supply via the power supply line 222 is enabled.

At this time, the power supply to the main circuit element group 240 is shut off. That is, only devices in the power saving operation group 250 operate when the image processing apparatus 100 is in the power saving mode. Further, the power unit 219 supplies power to the RAM 202, and hence the RAM 202 is shifted to a reduced power consumption state while backing up a system program through self-refresh operation.

As a result, in the power saving mode, it is possible to largely reduce power consumed by the image processing apparatus 100, compared with the normal power mode. Then, when a return instruction is input by the user from the console section 102, or when a card is detected by the card reader, described hereinafter, the CPU 201 controls the power supply controller 218 to return the image processing apparatus 100 from the power saving mode to the normal power mode.

As described above, in the present embodiment, power is supplied to the main circuit element group 240 and the power saving operation group 250 in the normal power mode. On the other hand, in the power saving mode, power is supplied not to the main circuit element group 240 but to the power saving operation group 250.

Although in the power saving mode in the present embodiment, the power supply to the CPU 201 is shut off, this is not limitative. For example, as another embodiment, the power saving mode may be configured to be a state in which the amount of power supplied to the CPU 201 is reduced than in the normal power mode and the operating frequency of the CPU 201 is lowered.

Figure 3:
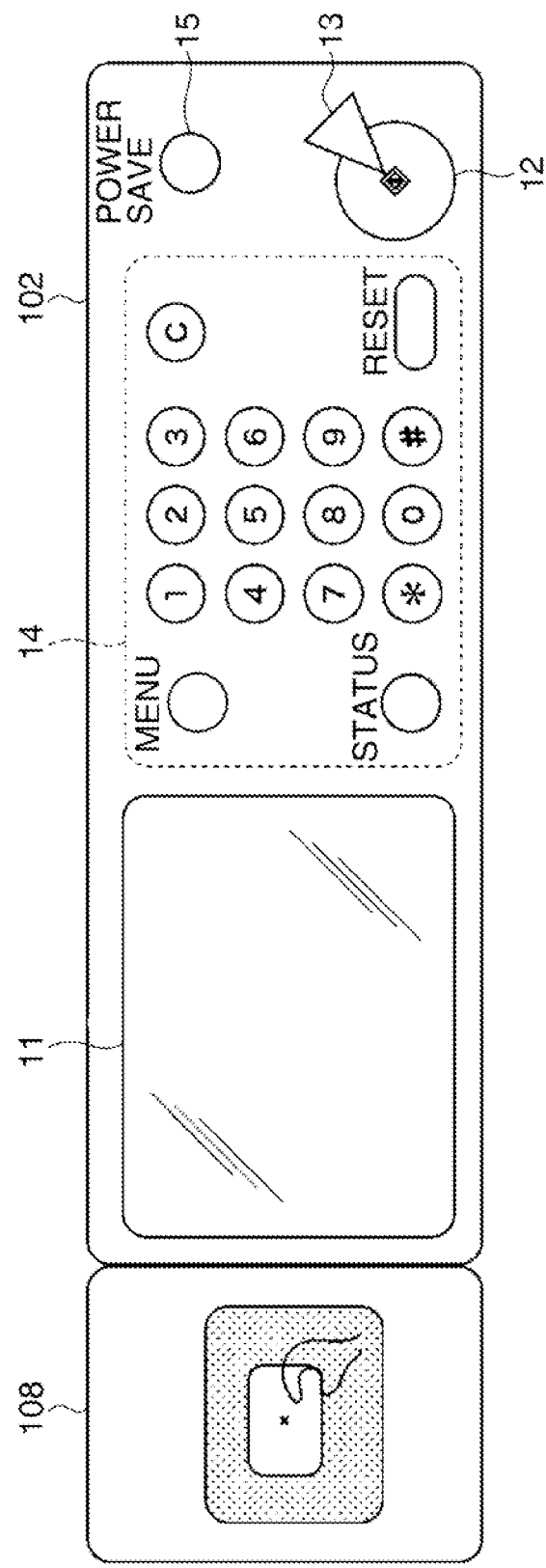
FIG. 3 is a view of an example of the appearance of a console section and a card reader appearing in FIG. 2.

FIG. 3 is a view of an example of the appearance of the console section 102 and the card reader 108, appearing in FIG. 2.

In FIG. 3, the console section 102 includes a liquid crystal operation panel 11, a start key 12, a stop key 13, and a hard key group 14.

The liquid crystal operation panel 11 as a display unit which displays information to the user is a combination of liquid crystal and a touch panel. The liquid crystal panel 11 displays an operation screen, and when a displayed key is depressed by the user, the liquid crystal operation panel 11 reads information associated with the depressed key. The display screen of the liquid crystal operation panel 11 displays a menu for operating the image processing apparatus 100 to prompt the user to perform an operation thereon, and also displays device information, such as operating conditions of component devices, and remaining amounts of consumables, such as sheets and toner.

The start key 12 is used for instructing the start of an operation for reading and printing an original image, and instructing the start of other functions. The stop key 13 is used for instructing to stop the operation in execution.

The hard key group 14 includes numeric keys, a clear key, a reset key, a menu key, and a status key, and is used for inputting, clearing, and resetting numbers, and instructing to display various information.

A power saving key 15 is used for inputting an instruction from the user for shifting the image processing apparatus 100 to the power saving mode, or returning the image processing apparatus 100 to the normal power mode, as mentioned above.

The card reader 108 is a reading device that is capable of reading information stored in an IC card in a non-contact manner from the IC card as an authentication medium used for user authenticating. The information is read by holding the IC card over an upper surface of the card reader 108 by the user. The user's operation of holding the IC card over the card reader 108 is sometimes expressed as a touch operation in the following description.

The information stored in the IC card includes account information of the user who uses the image processing apparatus 100, and so forth. Then, the CPU 201 verifies the account information read by the card reader 108 against the account information of the user stored in the HDD 217 in advance, whereby the user authentication is performed.

The image processing apparatus 100 can restrict users' use thereof according to this user authentication, and if the verified account information is the one of a user who is allowed to use the image processing apparatus 100, the image processing apparatus 100 becomes available to the user.

Although in the present embodiment, authentication is performed using the account information of the user, stored in the HDD 217, this is not limitative, but as another embodiment, a server, not shown, which is connected via the LAN 106, may store the account information of the user, and perform authentication.

Further, as shown in FIG. 3, the console section 102 and the card reader 108 are arranged such that when the user holds the IC card over the card reader 108, the user can check contents displayed on the liquid crystal operation panel 11.

Figure 4:
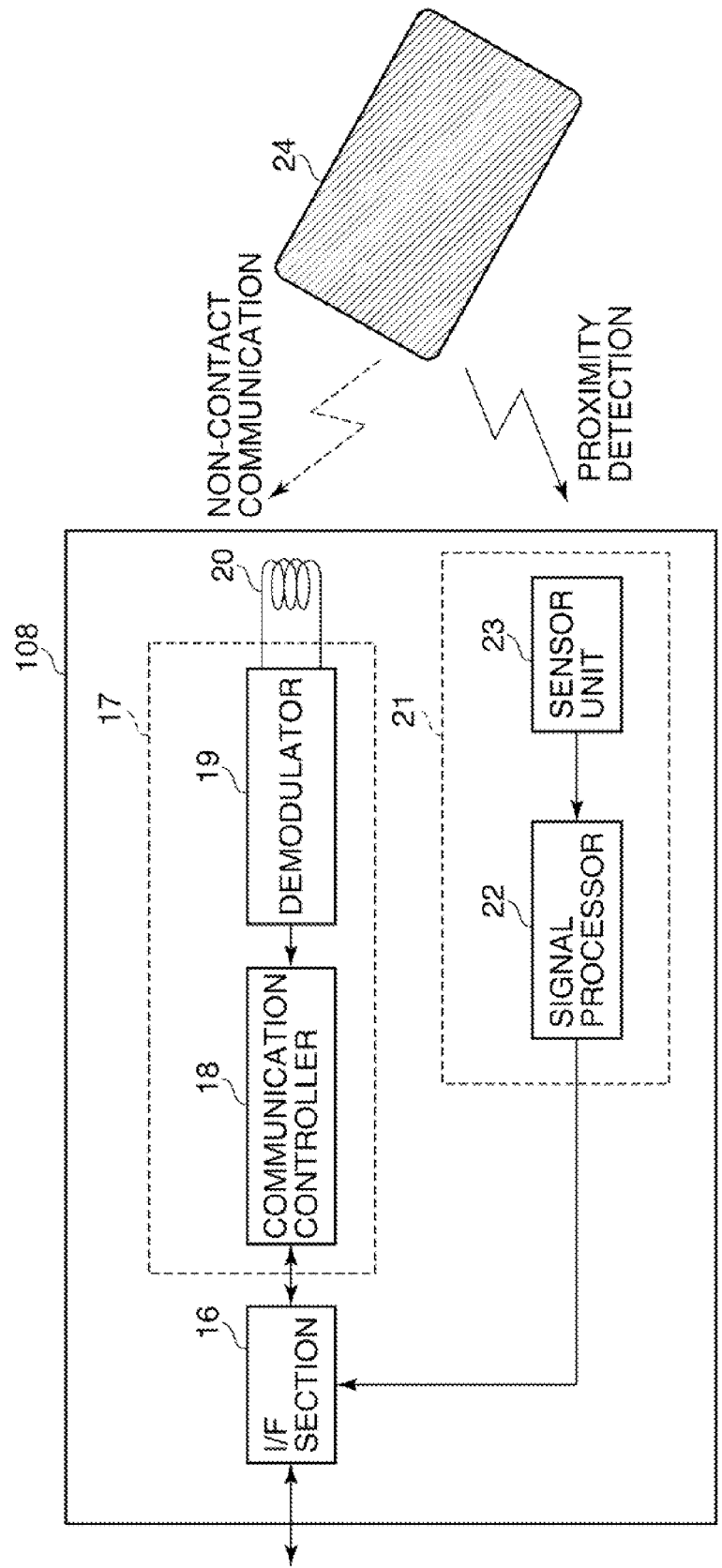
FIG. 4 is a schematic block diagram of the card reader appearing in FIG. 3.

FIG. 4 is a schematic block diagram of the card reader 108 appearing in FIG. 3.

In FIG. 4, the card reader 108 includes an interface section 16, a communication controller 18, a demodulator 19, a coil antenna 20, a signal processor 22, and a sensor unit 23.

In the present embodiment, the communication controller 18 and the demodulator 19 are collectively referred to as the communication system module 17. Further, the signal processor 22 and the sensor unit 23 are collectively referred to as the sensor system module 21. The above-mentioned communication system module 17 corresponds to an acquisition unit which acquires authentication information from the IC card used for authenticating the user. Further, the sensor system module 21 corresponds to a detection unit which detects proximity of the IC card to the card reader 108.

The antenna 20 receives an electromagnetic wave transmitted from the IC card shown in FIG. 4, denoted by reference numeral 24, when the IC card 24 is moved close to the card reader 108. The electromagnetic wave transmitted from the IC card 24 is e.g. an electromagnetic wave transmitted by modulating the account information of the user of the image processing apparatus 100, stored in the IC card 24.

The demodulator 19 demodulates the electromagnetic wave received by the antenna 20 to digital data, and sends the digital data to the communication controller 18. The communication controller 18 controls the demodulator 19 and the interface section 16, receives the data demodulated by the demodulator 19, and sends the received data to the interface section 16.

The interface section 16 is connected to the card reader interface 226 of the main controller 101 to exchange communication data between the card reader 108 and the main controller 101.

That is, in the card reader 108, the data which has been read from the IC card 24 and then demodulated by the demodulator 19 is sent to the main controller 101 as the user authentication data for the image processing apparatus 100.

The sensor unit 23 is a proximity sensor which is capable of detecting an object moving toward the card reader 108 in a non-contact manner. Although in the present embodiment, as an example of the sensor unit 23, an optical sensor which detects a change in transmitted light amount and reflective light is employed, this is not limitative. Any other proximity sensor can be employed insofar as it can detect proximity of an object in a non-contact manner according to an environment where the image processing apparatus 100 is installed.

Examples of the proximity sensor include a magnetic field detection sensor for detecting a change in magnetic field and generation of a magnetic field due to electromagnetic induction, and an electromagnetic wave detection sensor for detecting an electromagnetic wave. The examples of the proximity sensor further include an electric field detection sensor for detecting distribution of an electric field, an ultrasonic sensor for detecting reflection of an ultrasonic wave, and an infrared sensor for detecting infrared radiation from a heat source.

In the above-described configuration of the card reader 108, when the user moves the IC card 24 closer to the card reader 108 for authentication using the IC card 24, the sensor unit 23 detects proximity of the IC card 24.

When the image processing apparatus 100 is in the power saving mode, the signal processor 22 receives a detection signal from the sensor unit 23, and sends a control signal for returning the image processing apparatus 100 from the power saving mode to the normal power mode to the main controller 101 via the interface section 16.

Further, when the image processing apparatus 100 is in the power saving mode, the interface section 16 shuts off the power supply to the communication system module 17 so as to reduce power consumption.

Therefore, when the image processing apparatus 100 is in the power saving mode, communication processing by the communication system module 17 is not performed, but only processing for returning to the normal power mode by the operation of the sensor system module 21 is an enabled function.

Further, it is only required to enable the proximity detecting function of the sensor system module 21 only when the image processing apparatus 100 is in the power saving mode, and when the image processing apparatus 100 is in the normal power mode, the proximity detecting function may be disabled.

Figure 5A:
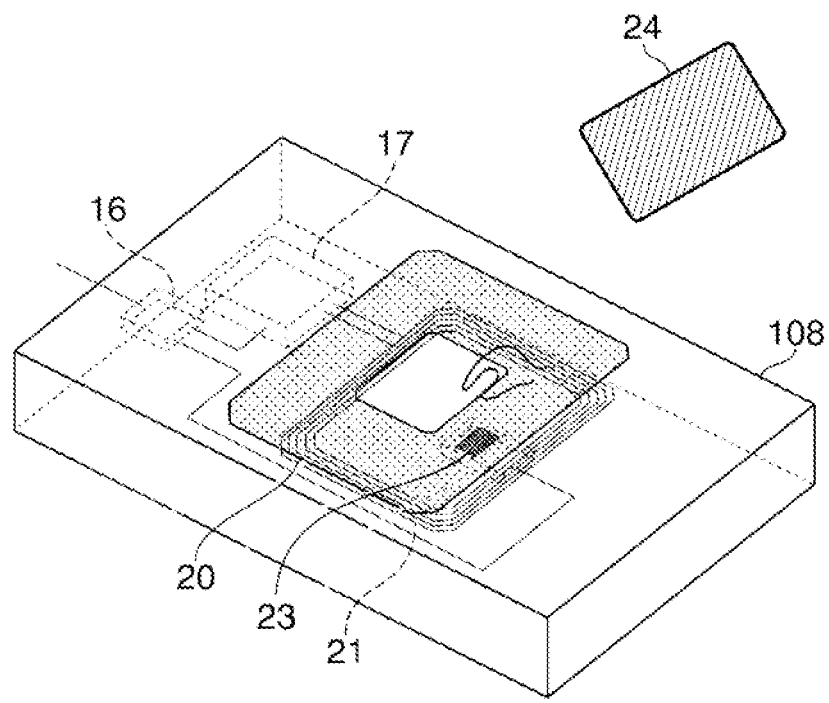
Figure 5B:
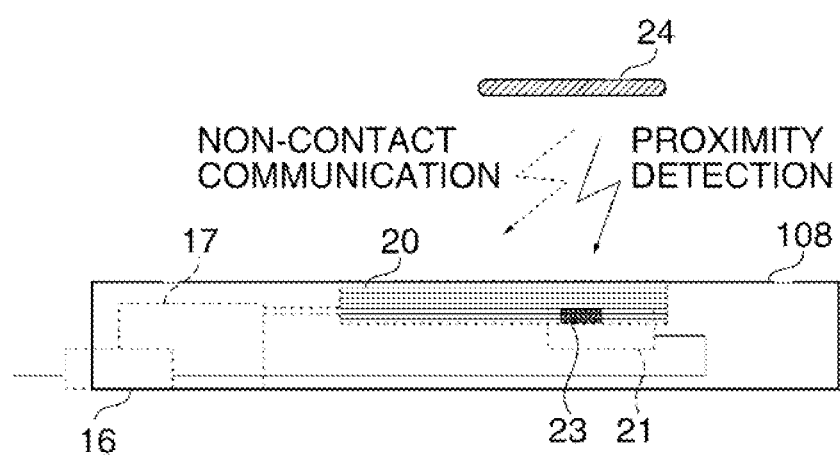

FIGS. 5A and 5B are views each showing the internal configuration of the card reader 108 shown in FIG. 4, in which FIG. 5A is a transparent view of the card reader 108, and FIG. 5B is a vertical cross-sectional view of the card reader 108.

FIGS. 5A and 5B each show a positional relationship between the interface section 16, the communication system module 17, the antenna 20, and the sensor system module 21.

As shown in FIG. 5A, the card reader 108 includes an illustration for prompting the user to perform an operation of touching the IC card thereto, and the user is expected to move the IC card 24 closer to a portion bearing the illustration.

Therefore, the antenna 20 is arranged in the card reader 108 at a location below the illustration for prompting the user to perform the touch operation so as to easily receive an electromagnetic wave transmitted from the IC card 24. Further, the sensor system module 21 is arranged at a location in the vicinity of the antenna 20 where it does not interfere with the function of the antenna 20.

Further, the sensor unit 23 of the sensor system module 21 is located toward the front of the image processing apparatus 100 which the user faces so as to enable the sensor unit 23 to easily detect proximity of the IC card 24 by the user's touch operation.

As described hereinabove, the communication processing by the communication system module 17 is not performed when the image processing apparatus 100 is in the power saving mode, and hence user authentication by the operation of touching the IC card 24 by the user is not performed either.

However, the antenna 20 and the sensor system module 21 are arranged as shown in FIG. 5A, whereby when the user performs the touch operation on the image processing apparatus 100 in the power saving mode, the sensor unit 23 detects the user's touch operation. By this detection, it is possible to return the image processing apparatus 100 to the normal power mode.

Figure 6:
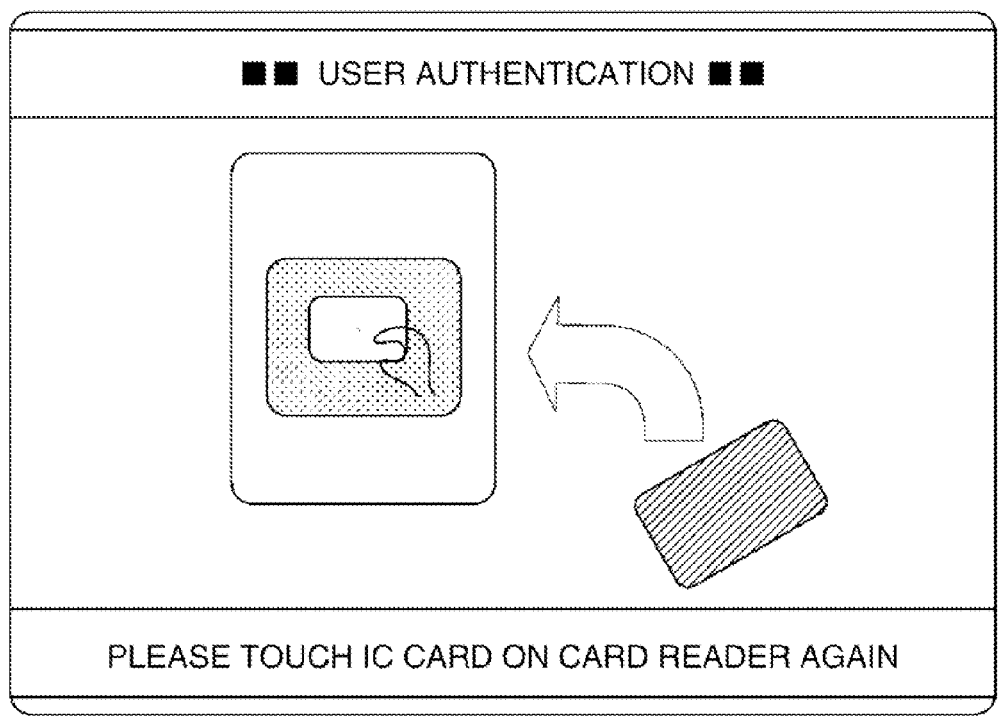
FIG. 6 is a view of an example of the screen display on a liquid crystal operation panel appearing in FIG. 3.

At this time, a screen shown in FIG. 6 is displayed on the console section 102 of the image processing apparatus 100 to prompt the user to perform the touch operation for user authentication again. FIG. 6 is a view of an example of the screen display on the liquid crystal operation panel 11 appearing in FIG. 3.

As described above, the user can consistently instruct execution of processing for returning the image processing apparatus 100 from the power saving mode to the normal power mode and user authentication processing, only by touch operation, and hence it is possible to improve the user-friendliness.

In the conventional technique, when the user has performed a touch operation without being aware that the image processing apparatus 100 is in the power saving mode, the user first notices that the image processing apparatus 100 is in the power saving mode because user authentication has not been available.

Then, the user operates the above-mentioned power saving key 15 to return the image processing apparatus 100 from the power saving mode, and then newly performs a touch operation on the card reader 108.

According to the present embodiment, it is possible to prevent the user from being caused to perform these troublesome operations.

Further, even in a system in which a server performs authentication, the image processing apparatus 100 is only required to supply power only to components necessary for returning from the power saving mode to the normal power mode, and hence it is possible to realize reduction of power consumption when the image processing apparatus 100 is in the power saving mode.

Figure 7:
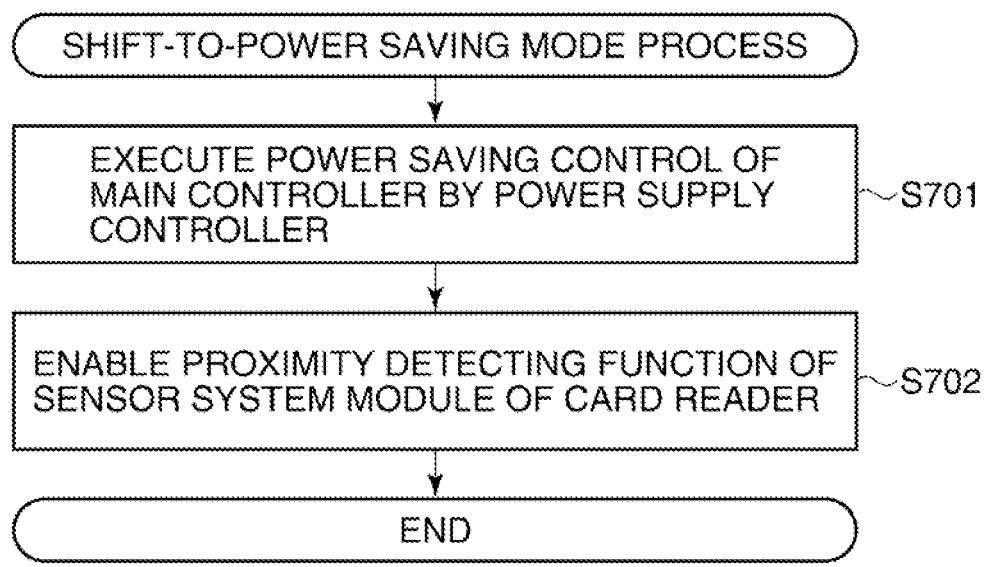
FIG. 7 is a flowchart of a shift-to-power saving mode process.

FIG. 7 is a flowchart of a shift-to-power saving mode process.

The shift-to-power saving mode process shown in FIG. 7 is realized, according to a program stored in the ROM 203, by the CPU 201 controlling the power supply destination to which power is supplied from the power supply controller 218, and the power supply controller 218 controlling the card reader 108 via the card reader interface 226.

The image processing apparatus 100 starts to shift from the normal power mode to the power saving mode so as to reduce power consumption, when the power saving key 15 of the console section 102 is depressed by the user, or when the image processing apparatus 100 has performed no operation, such as a printing operation, over a predetermined time period.

In FIG. 7, the CPU 201 performs power saving control of the main controller 101 by the power supply controller 218 (step S701). More specifically, the CPU 201 controls the power supply destination to which power is supplied from the power supply controller 218 such that the power supply via the power supply line 221 is disabled. Further, the CPU 201 controls the power supply destination to which power is supplied from the power supply controller 218 such that the power supply via the power supply line 222 is enabled.

Next, the power supply controller 218 causes the RAM 202 to shift from a normal operation to a self-refresh operation to thereby place the RAM 202 in a reduced power consumption state while backing up the system program.

Next, the power supply controller 218 enables the proximity detecting function of the sensor system module 21 of the card reader 108 via the card reader interface 226 (step S702), followed by terminating the present process.

By execution of the step S702, the proximity detecting function of the sensor unit 23 for detecting a touch operation for card verification is enabled, and control signal notification by the signal processor 22 for returning the image processing apparatus 100 to the normal power mode is enabled.

The steps S701 and S702 correspond to the operation of a power control unit which controls the power supply destination to which power is supplied from the power supply controller 218 such that the image processing apparatus 100 is shifted to the power saving mode in which power is supplied to the sensor system module 21, but the power supply to the communication system module 17 and the main circuit element group 240 is shut off.

By executing the above-described shift-to-power saving mode process, the image processing apparatus 100 completes shifting to the power saving mode in which power consumption of the image processing apparatus 100 is reduced, and enters a state where the image processing apparatus 100 is capable of returning to the normal power mode by the proximity detecting function of the sensor system module 21.

Figure 8:
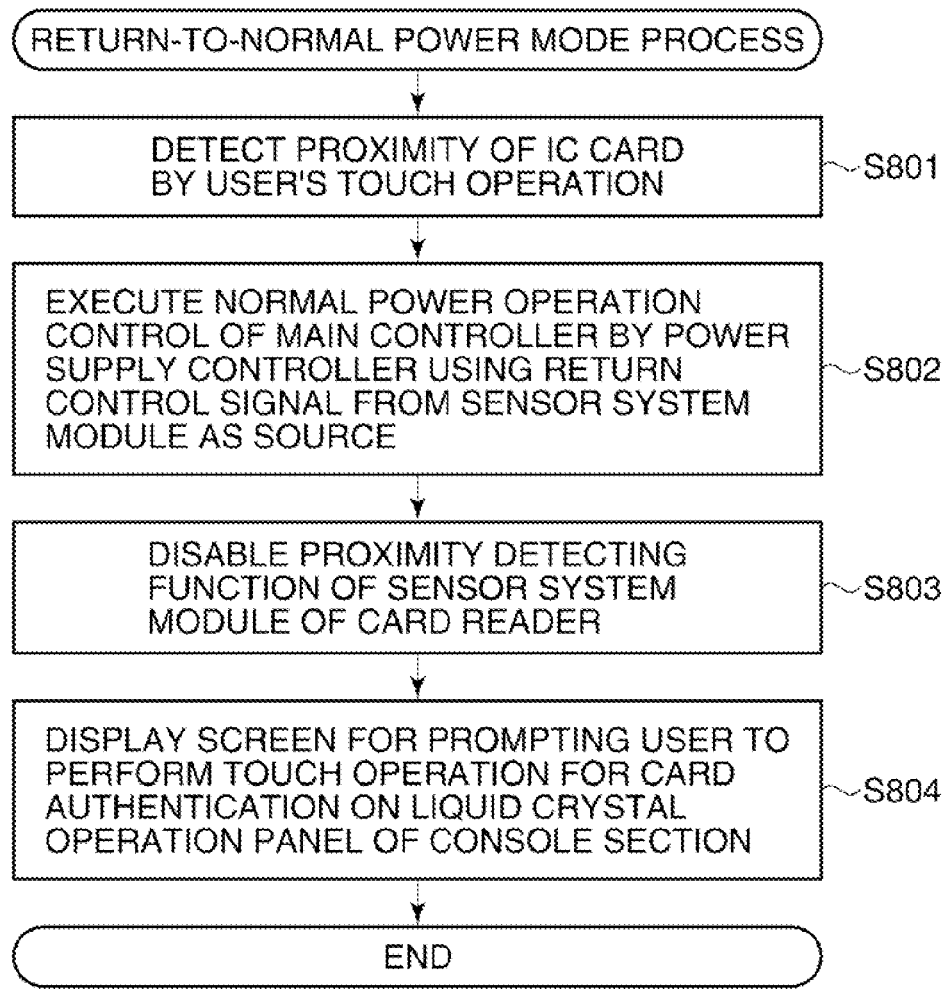
FIG. 8 is a flowchart of a return-to-normal power mode process.

FIG. 8 is a flowchart of a return-to-normal power mode process.

The return-to-normal power mode process shown in FIG. 8 is realized by controlling the power supply destination to which power is supplied from the power supply controller 218, according to a sequencer which defines the operation of the sensor system module 21 of the card reader 108.

Further, after the power supply to the power supply line 221 is enabled by the power supply controller 108, the return-to-normal power mode process is realized, according to the program stored in the ROM 203, by the CPU 201 controlling the console section 102 of the main controller 101.

In FIG. 8, the sensor unit 23 of the card reader 108 detects proximity of the IC card 24 caused by the user's touch operation (step S801). According to this detection, the process for returning the image processing apparatus 100 from the power saving mode to the normal power mode is started.

Then, the normal power operation control of the main controller 101 by the power supply controller 218 using a return control signal from the sensor system module 21 as a source is performed (step S802).

More specifically, the signal processor 22 sends the return control signal as a control signal to return the image processing apparatus 100 to the normal power mode, to the main controller 101, via the interface section 16 according to detection of the proximity by the sensor unit 23. Then, the card reader interface 226 having received the return control signal notifies the power supply controller 218 via the control signal line 223 that the image processing apparatus 100 is to return to the normal power mode in response to detection of the touch operation. The power supply controller 218 having received the return control signal controls the power supply such that the power supply to the power supply line 221 is enabled, and the power supply to the power supply line 222 is enabled. Further, the power supply controller 218 causes the RAM 202 to shift from the self-refresh operation to the normal operation, and the CPU 201 restarts the operation of the system program having being interrupted.

Next, the CPU 201 disables the proximity detecting function of the sensor system module 21 of the card reader 108 via the card reader interface 226 (step S803).

Then, the CPU 201 displays the screen (see FIG. 6) for prompting the user to perform a touch operation for card verification on the liquid crystal operation panel 11 of the console section 102 (step S804), followed by terminating the present process. By execution of the step S804, the image processing apparatus 100 returns from the power saving mode to the normal power mode, and enters a standby state in which the image processing apparatus 100 waits for user authentication.

The steps S801, S802, and S803 correspond to the operation of a power control unit. Actually, when the proximity of the IC card 24 has been detected by the sensor system module 21 in the power saving state (step S801), the following processing is executed: First, the CPU 201 controls the power supply destination to which power is supplied from the power supply controller 218 such that the image processing apparatus 100 is shifted to the normal power state in which power is supplied to the communication system module 17 and the main circuit element group 240 (step S802). Then, the CPU 201 controls the power supply destination to which power is supplied from the power supply controller 218 such that the power supply to the sensor system module 21 is shut off (step S803).

As described above, the user can return the image processing apparatus 100 to the normal power mode only by performing the touch operation, which makes it possible to reduce a bothersome operation accompanying user authentication, and as a result, it is possible to improve the convenience of the user who performs authentication using the IC card 24, compared with the conventional technique.

Further, the above step S804 corresponds to the operation of a display control unit that controls the liquid crystal operation panel 11 to display a message to prompt the user to perform an authentication operation using the IC card 24 when the proximity of the IC card 24 has been detected by the sensor system module 21.

By execution of the above-described return-to-normal power mode process, the image processing apparatus 100 is subjected to the processing for returning from the power saving mode to the normal power mode according to the user's touch operation for user authentication.

Further, by execution of the return-to-normal power mode process in FIG. 8, the image processing apparatus 100 returns from the power saving mode to the normal power mode in response to detection by the proximity detecting function of the sensor system module 21 of the card reader 108.

In the returning of the image processing apparatus 100 to the normal power mode, when the image processing apparatus 100 has returned from the power saving mode to the normal power mode according to the user's operation of touching the IC card 24, it is expected that user authentication by the user is normally performed immediately after the image processing apparatus 100 has returned to the normal power mode.

However, user authentication is not necessarily performed. For example, there is a case where even when the user has returned the image processing apparatus 100 to the normal power mode, the user walks away from the image processing apparatus 100 without performing user authentication. Alternatively, there is a case where the image processing apparatus 100 returns to the normal power mode due to erroneous detection by the sensor system module.

In this case, in spite of returning from the power saving mode to the normal power mode, the image processing apparatus 100 performs no processing, and hence power is wastefully consumed during the standby state in the normal power mode.

To eliminate this problem, in the case where the image processing apparatus 100 has returned to the normal power mode in response to detection by the proximity detecting function, a time period to elapse before shifting the image processing apparatus 100 to the power saving mode again is set to be shorter than a time period to elapse before the shifting in usual cases. This makes it possible to reduce wasteful power consumption during the standby state in the normal power mode.

Figure 9:
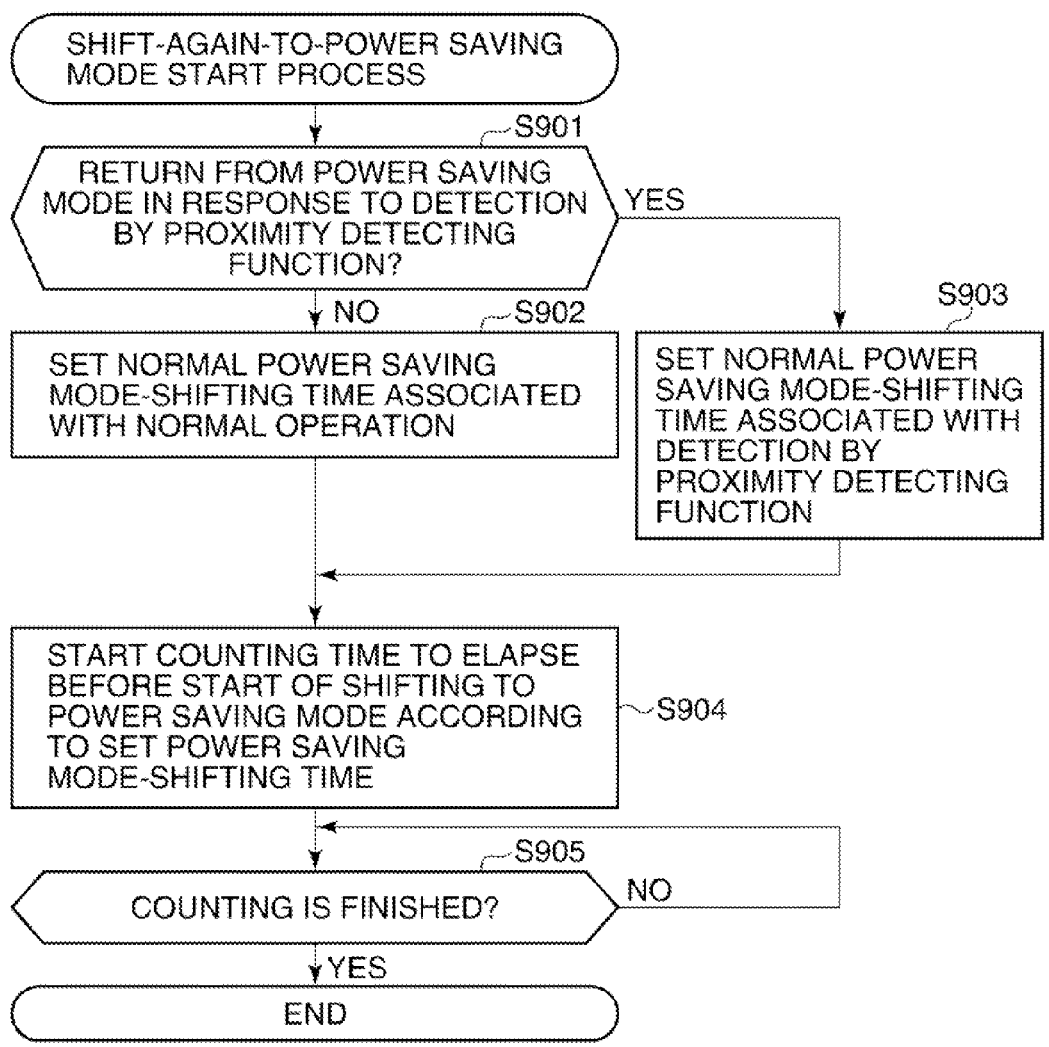
FIG. 9 is a flowchart of a shift-again-to-power saving mode start process executed by a CPU.

FIG. 9 is a flowchart of a shift-again-to-power saving mode start process executed by the CPU 201.

FIG. 9 shows an example of the shift-again-to-power saving mode start process for starting to shift the image processing apparatus 100 to the power saving mode again after the image processing apparatus 100 has returned from the power saving mode to the normal power mode in response to detection by the proximity detecting function of the sensor system module 21 of the card reader 108.

Further, the shift-again-to-power saving mode start process is realized, according to a program stored in the ROM 203, by the CPU 201 of the main controller 101 performing processing. The shift-again-to-power saving mode start process is started from a state immediately after the image processing apparatus 100 has returned from the power saving mode to the normal power mode. That is, the process is started immediately after execution of the step S804 in FIG. 8.

In FIG. 9, it is determined whether or not the image processing apparatus 100 has returned from the power saving mode in response to detection by the proximity detecting function (step S901). More specifically, the CPU 201 determines a part of the power saving operation group 250 from which the power supply controller 218 has received the return control signal via the control signal line 223 as a cause of returning the image processing apparatus 100 from the power saving mode to the normal power mode.

Therefore, if the received return control signal has been received from the card reader interface 226, the answer to the step S901 is affirmative. On the other hand, if the received return control signal has been received from a part of the power saving operation group except the card reader interface 226, the answer to the step S901 is negative.

If it is determined in the step S901 that the image processing apparatus 100 has returned from the power saving mode in response to detection by the proximity detecting function (YES to the step S901), the CPU 201 sets a power saving mode-shifting time associated with detection by the proximity detecting function (step S903), and the process proceeds to a step S904.

The power saving mode-shifting time associated with detection by the proximity detecting function is determined based on a set value stored in the flash memory 204 in advance. The set value is a value indicative of e.g. 20 seconds.

On the other hand, if it is determined in the step S901 that the image processing apparatus 100 has returned from the power saving mode not in response to detection by the proximity detecting function (NO to the step S901), the CPU 201 sets a power saving mode-shifting time associated with normal operation which is different from the power saving mode-shifting time associated with detection by the proximity detecting function (step S902).

The power saving mode-shifting time associated with normal operation is determined based on a set value stored in the flash memory 204 in advance. The set value is a value indicative of e.g. 10 minutes.

The power saving mode-shifting time set in the steps S902 and S903 is intended to mean a time period to elapse before shifting of the image processing apparatus 100 to the power saving mode so as to reduce power consumption because the image processing apparatus 100 performs no operation, such as printing.

Note that the power saving mode-shifting time associated with normal operation is set to be longer than the power saving mode-shifting time associated with detection by the proximity detecting function. Further, the set value stored in the flash memory 204 in advance may be set to a desired value by receiving an input of the user from the console section 102.

Next, the CPU 201 starts counting time to elapse before the start of shifting the image processing apparatus 100 to the power saving mode according to the power saving mode-shifting time set in the step S902 or S903 (step S904).

Then, when the counting of time to elapse before the start of shifting the image processing apparatus 100 to the power saving mode is completed (YES to the step S905), the CPU 201 starts to shift the image processing apparatus 100 to the power saving mode. That is, the process proceeds to the step S701 in FIG. 7.

According to the process in FIG. 9, when the image processing apparatus 100 has been shifted to the normal power state in response to detection of the proximity of the IC card 24, the image processing apparatus 100 is shifted to the power saving mode in a shorter time than a case where the image processing apparatus 100 has been shifted to the normal power mode not due to the detection of the proximity of the IC card 24.

By execution of the above-described shift-again-to-power saving mode start process, when the image processing apparatus 100 has been shifted to the normal power mode in response to detection by the proximity detecting function, it is possible to make shorter the time period to elapse before shifting of the image processing apparatus 100 to the power saving mode again than the time period to elapse before the shifting in usual cases.

This makes it possible to reduce wasteful power consumption when the image processing apparatus 100 is on standby in the normal power mode.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-025021, filed Feb. 8, 2012, which is hereby incorporated by reference herein in its entirety.

What is claimed is:

1. An information processing apparatus comprising:
an acquisition unit configured to acquire authentication information for use in authentication of a user, the authentication information being stored in an authentication medium;
a display unit configured to display information to the user;
a detection unit configured to detect the authentication medium which is held over the acquisition unit; and
a power control unit configured to control a supply of power to the acquisition unit and the detection unit,
wherein the power control unit controls the supply of power to supply power to the acquisition unit and causes the display unit to display a message prompting the user to hold the authentication medium over the acquisition unit, when the detection unit detects the authentication medium in a power saving state in which power is supplied to the detection unit and the supply of power to the acquisition unit is shut off.

2. The information processing apparatus according to claim 1, wherein the message displayed on the display unit includes a message of prompting the user to hold the authentication medium over the acquisition unit again.

3. The information processing apparatus according to claim 1, wherein the display unit is arranged in the vicinity of the acquisition unit.

4. The information processing apparatus according to claim 1, wherein the power control unit shuts off the supply of power to the detection unit in accordance with the detection unit detecting the authentication medium.

5. The information processing apparatus according to claim 1, wherein when the information processing apparatus has been shifted to a normal power state, in which power is supplied to the acquisition unit, in response to detection of the authentication medium, the power control unit shifts the information processing apparatus from the normal power state to the power saving state in a shorter time than when the information processing apparatus has been shifted to the normal power state in response to another factor different from the detection of the authentication medium.

6. The information processing apparatus according to claim 1, further comprising a printing unit configured to print an image on a sheet.

7. The information processing apparatus according to claim 1, further comprising a control unit configured to authenticate the user based on the authentication information acquired by the acquisition unit,
wherein the acquisition unit includes an interface for transmitting the authentication information to the control unit.

8. The information processing apparatus according to claim 1, wherein a supply of power to an interface of the acquisition unit is shut off in the power saving state.

9. A method of controlling an information processing apparatus including an acquisition unit configured to acquire authentication information for use in authentication of a user, the authentication information being stored in an authentication medium, a display unit configured to display information to the user, and a detection unit configured to detect the authentication medium which is held over the acquisition unit, the method comprising:
controlling a supply of power to the acquisition unit and the detection unit; and
controlling the supply of power to supply power to the acquisition unit and cause the display unit to display a message prompting the user to hold the authentication medium over the acquisition unit, when the detection unit detects the authentication medium in a power saving state in which power is supplied to the detection unit and the supply of power to the acquisition unit is shut off.

10. A non-transitory computer-readable storage medium storing a computer-executable program for executing a method of controlling an information processing apparatus including an acquisition unit configured to acquire authentication information for use in authentication of a user, the authentication information being stored in an authentication medium, a display unit configured to display information to the user, and a detection unit configured to detect the authentication medium which is held over the acquisition unit, the method comprising:
controlling a supply of power to the acquisition unit and the detection unit; and
controlling the supply of power to supply power to the acquisition unit and cause the display unit to display a message prompting the user to hold the authentication medium over the acquisition unit, when the detection unit detects the authentication medium in a power saving state in which power is supplied to the detection unit and the supply of power to the acquisition unit is shut off.

* * * * *